March 25, 1924.
W. F. WATKINS
PARACHUTE
Original Filed Aug. 9, 1919    2 Sheets-Sheet 1
1,487,825
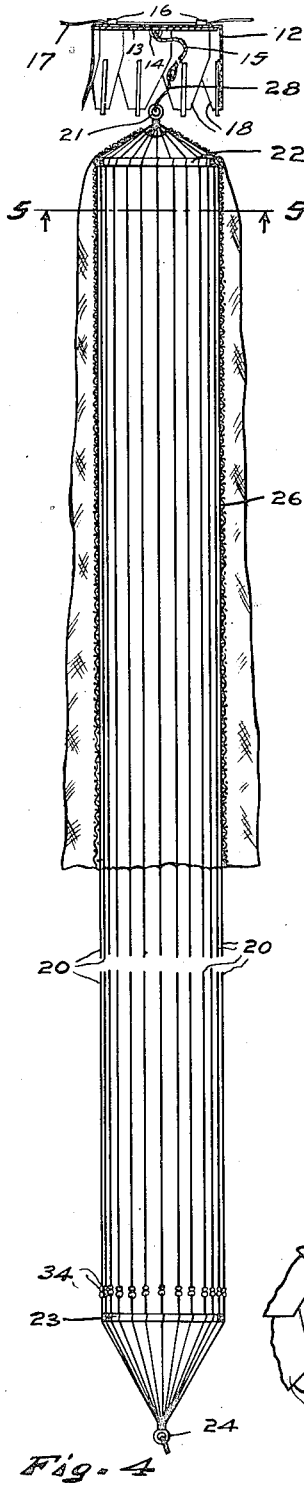
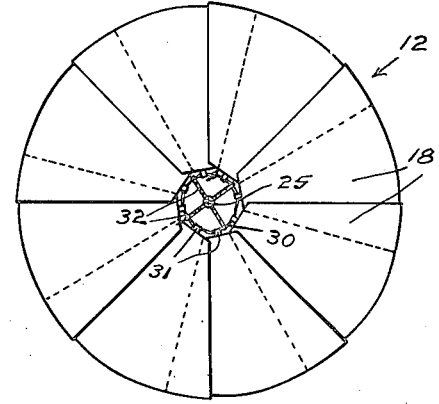
Fig. 1
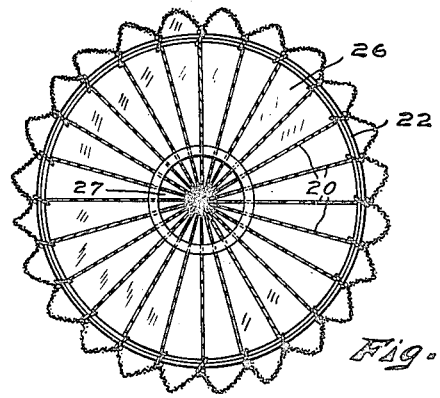
Fig. 5
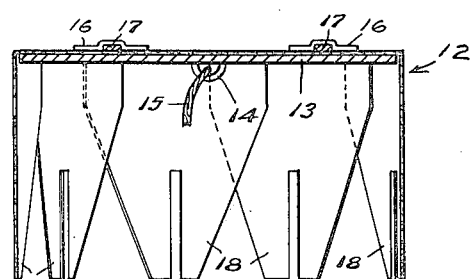
Fig. 2
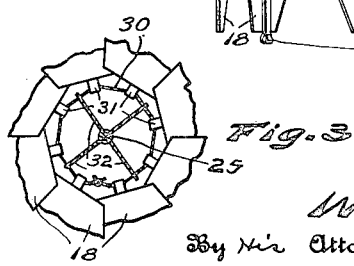
Fig. 3
Fig. 4
Inventor
William F. Watkins
By his Attorney
Fred C. Matheny March 25, 1924. 1,487,825
W. F. WATKINS
PARACHUTE
Original Filed Aug. 9, 1919  2 Sheets-Sheet 2

Inventor
William F. Watkins
By his Attorney
Fred C. Matheny

Patented Mar. 25, 1924.

1,487,825

UNITED STATES PATENT OFFICE.

WILLIAM F. WATKINS, OF SEATTLE, WASHINGTON, ASSIGNOR TO WATKINS APPLIANCE COMPANY, INC., OF SEATTLE, WASHINGTON, A CORPORATION.

PARACHUTE.

Application filed August 9, 1919, Serial No. 316,503. Renewed July 27, 1922. Serial No. 578,080.

*To all whom it may concern:*

Be it known that I, WILLIAM F. WATKINS, a citizen of the United States, residing at Seattle, in the county of King and State of Washington, have invented a certain new and useful Improvement in Parachutes, of which the following is a specification.

My invention relates to improvements in parachutes and the object of my improvement is to provide a parachute that is safe and reliable in operation and one that is light in weight and compact in construction and that may be folded into a receptacle of convenient shape from which it will automatically release when connected with a falling weight thereby rendering the parachute especially desirable for emergency use in connection with aeroplanes.

Further and more specific objects are to provide means for insuring that the parachute will open when it is pulled out of the receptacle; to provide a new and improved form of receptacle having closure means that will release and permit the receptacle to open when a pull is exerted on the parachute; to provide detachable clips in the parachute ropes to facilitate the untangling of such ropes and to provide means for influencing the direction of movement or exerting a guiding effect on the parachute during the descent.

In the use of parachutes it sometimes happens that the pressure of the external air causes the parachute to become air locked and to fail to open. My invention overcomes this difficulty by providing means for spreading the parachute ropes when a pull is exerted on such ropes thereby opening an air passageway from the bottom upwardly into the parachute.

The invention consists in the novel construction adaptation and combination of parts of a parachute as will be more clearly hereinafter described and claimed.

Figure 6:
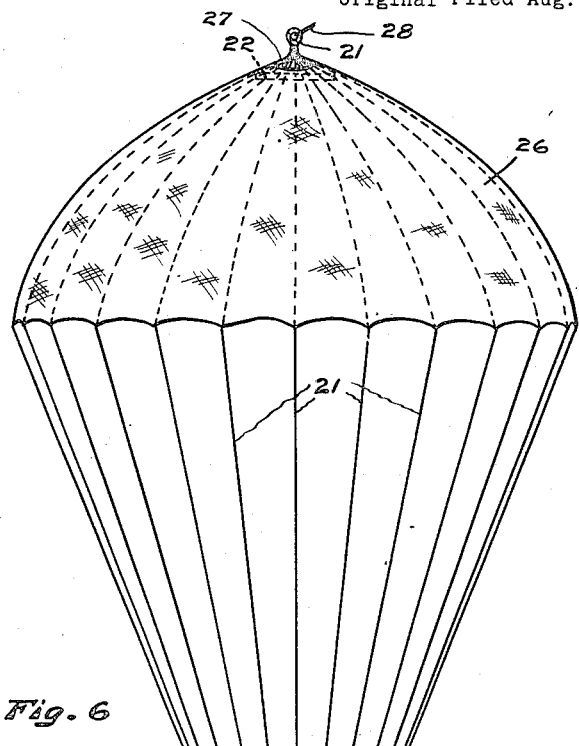
Figure 9:
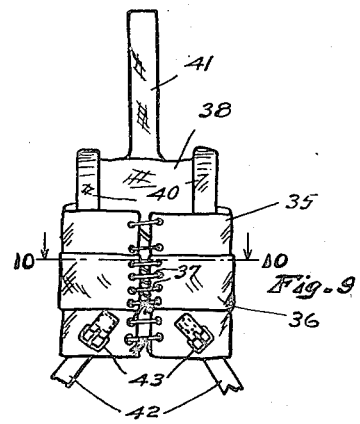
Figure 12:
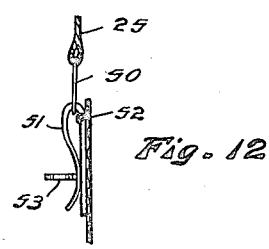
Figure 7:
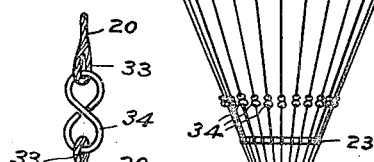
Figure 10:
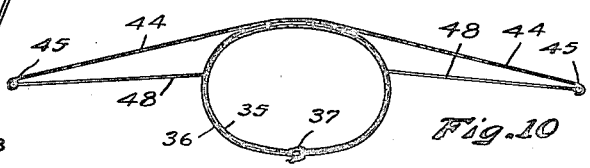
Figure 8:
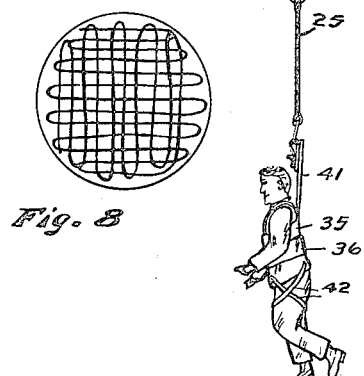
Figure 11:
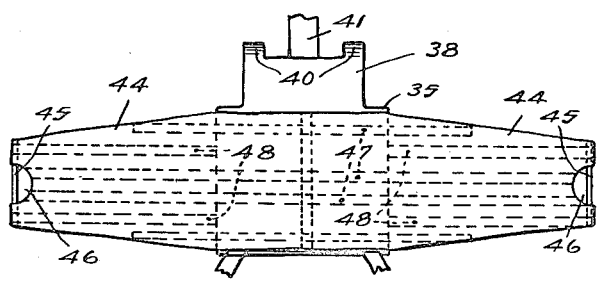

In the accompanying drawings Figure 1 is a plan view of the parachute receptacle as it may appear when the parachute is folded therein and the receptacle is closed; Figure 2 is a view in medial cross section of the receptacle as it may appear when it is open and the parachute is removed therefrom; Figure 3 is an enlarged fragmentary view showing the easily releasable means for holding the flaps of the bag closed; Figure 4 is a view in longitudinal mid-section showing a position that the parachute may assume just after it has been pulled out of the bag and before it has opened; Figure 5 is an enlarged sectional view on broken line 5, 5 of Figure 4; Figure 6 is a view in elevation showing the parachute in open or operative position; Figure 7 is an enlarged view of a detail of the invention; Figure 8 is a somewhat diagrammatic plan view illustrating the manner of folding the parachute ropes in the receptacle; Figure 9 is a view in front elevation of a sling that may be connected with this parachute; Figure 10 is a view in cross section of the same substantially on a broken line 10, 10 of Figure 8; Figure 11 is a view in rear elevation of the same with the guiding wings extended, and Figure 12 is a view in elevation of a detail of the invention.

Like reference numerals designate like parts throughout the several views.

Referring to the drawings the numeral 12 designates a parachute receptacle which may be formed of leather or canvas and which may be of substantially cylindrical shape, when closed, as shown in Figure 1. One end of the receptacle is lined with a solid disk 13 of strong relatively light wood that is provided at its center with an eye or staple 14 to which a short cable 15 may be secured. The disk 13 is rigidly secured to clips 16 through which straps 17 may pass, the straps 17 being used to secure the receptacle to any support as the body of an aeroplane.

18 are flaps that are rigidly connected with the receptacle at the periphery of the disk 13 and are arranged in overlapping relation so that they form the sides and cover for such receptacle.

The parachute proper comprises a plurality of small ropes or cables 20 that are lashed together at their upper ends to form a loop 21 and thence extend in divergent relation from such loop to and around a hoop 22 as more clearly shown in Figure 5, such cables being rigidly and immovably secured to the hoop 22 and the relatively long portions of such cables being arranged to hang from the hoop 22.

Near their bottom ends the cables 20 are rigidly secured to another hoop 23 preferably of substantially the same size as the hoop 22 and such cables are then made to converge and are lashed or otherwise secured together to form a loop 24 to which a relatively strong cable 25 may be connected.

The shroud 26 or covering of the parachute is of light strong material, as silk, formed in the shape of an umbrella and secured to the ropes 20 in such a manner that the ropes reinforce and support the shroud. The center of the shroud 26 which constitutes the uppermost end of the parachute, preferably has a small opening 27 provided therein which permits some air to pass therethrough and which serves to render the parachute more steady when in use.

The loop 21 at the top of the parachute is connected by a relatively small and weak breaking string 28 with the short cable 15 that is secured to the parachute receptacle so that when the parachute is pulled out of the receptacle the breaking string 28 will be strong enough to straighten the parachute out but will be broken by weight of the falling load that is secured to such parachute.

The parachute is folded into the receptacle by first stretching such parachute out full length, taking care that the folds of the shroud are all on the outside of the ropes as illustrated in Figure 5 and that none of such folds project inwardly between such ropes. The loop 21 is then tied to the cable 15 with the breaking string 28 and the hoop 22 is placed in the receptacle on the disk 13. The parachute is then folded back and forth across the receptacle up to the point where the periphery of the shroud 26 is connected with the ropes 20 after which the ropes 20 are preferably gathered together and their remaining lengths folded in criss cross relation as indicated in Figure 8. The bottom hoop 23 is then placed on the crossed ropes and the flaps 18 folded over as shown in Figure 1, and fastened by passing a relatively light string 30 through loops or eyelets 31 that are secured to the ends of the flaps.

When the flaps are folded a central opening is left and the cable 25 is allowed to pass outwardly through this central opening so that it may be connected with the object that is to be lowered by the parachute. After the flaps 18 are closed and made fast by the lacing string 30 the cable 25 is secured to such lacing string by a plurality of cords 32 that are stronger than the lacing string so that when a jerk is exerted on the cable 25 the lacing string 30 will be broken and pulled out of the eyelets 31 thus permitting the receptacle to open and the parachute to be pulled out. In practice it has been found very satisfactory to use four of the cords 32 but it will be understood that either a greater or a less number of such cords may be used.

For the purpose of providing a quick and easy means of untangling the ropes 20 in case they should become tangled as they often do I have severed each of such ropes at a point a short distance above the hoop 23, have formed loops 33 in the severed ends and have provided clips 34, of substantially the shape of a figure 8, see Figure 7, for securing the two looped ends together.

In use the receptacle 12 with the parachute contained therein will be secured to the aeroplane or air ship from which the descent is to be made and an object as a person or a package of freight will be secured to the cable 25. When the object is released in the air and starts to fall the jerk and weight of the falling object will break the string 30 thereby opening the receptacle and drawing the parachute out into a position as illustrated in Figure 4, the breaking string 28 being strong enough to straighten out the ropes 20 before it breaks thus spreading the bottom of the parachute and causing a cylindrical air passageway into the parachute to be formed which insures that the parachute will open.

One form of sling or harness that has been found very satisfactory when used with this parachute is shown in Figures 9, 10 and 11, and comprises a body portion or jacket 35 reinforced by a belt 36 both the body portion and the belt being adapted to be laced in front by lacing strings 37. The rear part of the body portion 35 projects upwardly as at 38 and has shoulder straps 40 and a main supporting strap 41 connected therewith. The lower rear part of the body portion has leg straps 42 secured to each side thereof which leg straps are adapted to extend forwardly around the outside of the wearer's hip, thence completely around the leg and forwardly and upwardly to buckles 43 on the front of the body portion 35, see Figure 6.

For the purpose of enabling the person making the descent to exert a guiding influence on the parachute I have provided wing members 44 which are constructed of light fabric as silk stitched to the medial back portion of the jacket 35 and secured at their outer ends to relatively light cross bars 45 the wing members being cut away as at 46 to provide a hand hold.

Connected with the wing members 44 are strips 47 of elastic that extend to the center of the jacket 35 and serve to gather in the wing members when they are not in use and connected with the bars 45 are other strips 48 of elastic whose inner ends are secured to the sides of the jacket 35 so that when the bars 45 are released they will be drawn inwardly against the sides of the jacket into positions where they may be grasped by the hands when they are to be extended.

By extending the wings 44 and turning them into various angular positions the person making the descent may be able to guide and control the movement of the parachute and to deflect it slightly from the path in which it is drifting, thereby avoiding landings in undesirable places that could not be avoided without the steering means.

The means for connecting the cable 25 to the main supporting strap 41 of the harness is preferably adapted to be released quickly and may comprise a ring 50 on the end of the rope 25, that is adapted to be hooked within a clip 51 that is pivoted as at 52 to the strap 41, and is held in the position shown in Figure 12 by a thumb piece 53.

It is obvious that changes in the form of construction and arrangement of the various parts of this parachute may be resorted to within the scope of the following claims.

What I claim is:—

1. A parachute receptacle comprising a rigid circular back portion, overlapping flap members secured to the edges of said back portion and arranged to form the sides and end of said receptacle the said flaps being arranged to fold with their ends toward the center of said receptacle in such manner that a central opening is left through which a cable that is connected with a parachute may project, a breaking string arranged to be connected with the end of each of said flaps for holding said flaps in a closed position and means for connecting the outwardly projecting parachute cable to said breaking string at a plurality of points.

2. A parachute receptacle comprising a rigid back portion, flap members secured to the edges of said back portion and arranged to form the sides and end of said receptacle, the said flaps being arranged to fold with their ends toward the center of said receptacle in such manner that a central opening is left through which a cable that is connected with a parachute may project, a breaking string arranged to be connected with the ends of each said flaps for holding said flaps in a closed position, and means for connecting the outwardly projecting parachute cable to said breaking string.

3. A parachute sling comprising a jacket portion arranged to fit the body of a person, wing members secured to said body portion, elastic means for normally holding said wing members in closely folded relation with respect to said jacket portion and handholds provided on the ends of said wing members whereby said wing members may be extended by movement of the arms to serve as guides.

In witness whereof, I hereunto subscribe my name this 23rd day of July A. D. 1919.

WILLIAM F. WATKINS.